United States Patent [19]
Schmelzer et al.

[11] 4,350,799
[45] Sep. 21, 1982

[54] THERMOPLASTIC TERNARY MOLDING COMPOSITION OF POLYURETHANE POLYPHOSPHONATES AND POLYCARBONATE RESINS

[75] Inventors: Hans G. Schmelzer, Pittsburgh, Pa.; Manfred Schmidt, New Martinsville; Robert P. Yeater, Moundsville, both of W. Va.

[73] Assignee: Mobay Chemical Corporation, Pittsburgh, Pa.

[21] Appl. No.: 302,890

[22] Filed: Sep. 16, 1981

[51] Int. Cl.$^3$ ............. C08L 75/06; C08L 75/28; C08L 69/00; C08L 85/02
[52] U.S. Cl. ..................... 525/453; 525/403; 525/413; 525/439; 525/538
[58] Field of Search .............. 525/439, 453, 413, 403, 525/538

[56] References Cited

U.S. PATENT DOCUMENTS 3,214,411 10/1965 Saunders et al. ............... 260/75
3,214,489 10/1965 Park ................................. 525/439
3,287,442 11/1966 Caldwell ......................... 525/403
3,541,183 11/1970 Kallert ............................ 525/439
4,034,016 7/1977 Baron ............................. 525/439
4,067,927 1/1978 Weil ............................... 525/538

FOREIGN PATENT DOCUMENTS 2925207 4/1981 Fed. Rep. of Germany .
2944093 5/1981 Fed. Rep. of Germany .

OTHER PUBLICATIONS

Chemical Abstracts, vol. 95:81795z, p. 20, 1981.

Primary Examiner—Paul Lieberman
Attorney, Agent, or Firm—Gene Harsh; Lawrence S. Pope; Aron Preis

[57] ABSTRACT

The invention is directed to a molding composition comprising an intimate, well dispersed blend of thermoplastic polyurethane, thermoplastic polyphosphonate and thermoplastic polycarbonate which composition is characterized by an improved level of flame resistance. A process for the preparation of said composition is also disclosed.

10 Claims, No Drawings

THERMOPLASTIC TERNARY MOLDING COMPOSITION OF POLYURETHANE POLYPHOSPHONATES AND POLYCARBONATE RESINS

FIELD OF THE INVENTION

This invention relates to polymer blends and more particularly to molding compositions comprising thermoplastic polyurethane, polyphosphonate and polycarbonate.

BACKGROUND OF THE INVENTION

Because of their unique combination of mechanical properties, thermoplastic polyurethanes (hereinafter TPU) have been extensively used in a variety of molding applications. Articles molded therefrom have met the stringent engineering criteria governing applications in the automotive, electrical, mechanical equipment and footwear industries. However, the flammability rating of TPU (UL-94-$\frac{1}{4}$", V-2) limits their utility in certain applications where a greater resistance to flame is required. Halogenated fire retardants, singly or in combination with antimony oxide have been reported to improve the flame retardance of these resins but are known to be unsuitable for some applications where corrosion upon evolution of hydrogen halides attended upon combustion is a determining factor.

Thermoplastic polyphosphonates are characteristically of exceptionally high rating of flame resistance-see for instance German Patent Application No. P 29 44 093.5. Due in part to their level of mechanical properties however, thermoplastic polyphosphonates are beneficially used in a narrower field of applications.

Polyblends of TPU and certain thermoplastic polyphosphonates purposed at combining their individually useful properties have been reported (U.S. Ser. No. 160,646 filed June 18, 1980 now U.S. Pat. No. 4,331,614). It has been the experience of those skilled in the art that certain other thermoplastic polyphosphonates, desirable as components in a blend with TPU are not compatible and do not easily blend therewith. Attempts to prepare such blends invariably led to a poorly dispersed inhomogeneous mixture unsuited for molding applications.

BRIEF DESCRIPTION OF THE INVENTION

A thermoplastic ternary molding composition comprising a homogeneous, well-dispersed blend of polyurethane, polyphosphonate and polycarbonate resin, characterized by an improved level of flammability rating is prepared by the blending upon co-melting of thermoplastic polyurethane and a binary composition comprising polyphosphonate and polycarbonate.

DETAILED DESCRIPTION OF THE INVENTION

I. THERMOPLASTIC POLYURETHANES

In the context of the present invention, thermoplastic polyurethanes are those generally prepared from a diisocyanate, a polyester or polyether and a chain extender. These thermoplastic polyurethanes are substantially linear and maintain thermoplastic processing characteristics.

The thermoplastic polyurethanes may be synthesized by methods disclosed in U.S. Pat. No. 3,214,411, incorporated herein by reference. A particularly useful polyester resin which may be used as a starting material for the thermoplastic polyurethanes is produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto so that the final water content is from about 0.01 to about 0.02%, preferably from about 0.01 to 0.05%.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol, up to about 1%, may be used along with the glycols such as, for example, trimethylolpropane, glycerine, hexanetriol and the like. The resulting hydroxyl polyester may have a molecular weight of at least about 600, a hydroxyl number of about 25 to about 190 and preferably between about 40 and about 60, an acid number of between about 0.5 and about 2 and a water content of about 0.01 to about 0.2%.

The organic diisocyanate to be used in the preparation of the elastomer is preferably 4,4'-diphenylmethane diisocyanate. It is desired that the 4,4'-diphenylmethane diisocyanate contain less than about 5% of 2,4'-diphenylmethane diisocyanate and less than about 2% of the dimer of diphenylmethane diisocyanate. It is further desired that the acidity calculated as HCl be from about 0.001 to 0.2%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Other diisocyanates may be used in preparing the thermoplastic polyurethanes such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like.

Any suitable chain extending agent having active hydrogen containing groups reactive with isocyanate groups may be used such as, for example, diols including ethylene glycol, propylene glycol, butylene glycol, 1,4-butanediol, butenediol, bytynediol, xylylene glycols, amylene glycols, 1,4-phenylene-bis-β-hydroxy ethyl ether, 1,3-phenylene-bis-β-hydroxy ethyl ether, bis-(hydroxymethyl-cyclohexane), hexanediol, thiodiglycol and the like; diamines including ethylene diamine, propylene diamine, butylene diamine, hexamethylene diamine, cyclohexalene diamine, phenylene diamine, tolylene diamine, xylylene diamine, 3,3'- dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. Nos. 2,620,516; 2,621,166 and 2,729,618, all incorporated herein by reference, may be used. If desirable, a small amount of polyfunctional material may be utilized. This polyfunctional chain extender, however, should not be present in an amount greater than about 1% by weight. Any suitable polyfunctional compound may be used in this application such as, for example, glycerine, trimethylolpropane, hexanetriol, pentaerythritol and the like.

The polyester, the organic diisocyanate and the chain extender may be individually heated preferably to the temperature of from about 60° C. to about 135° and then the polyester and chain extender may be substantially simultaneously mixed with the diisocyanate. Preferably, the chain extender and the polyester, each of which has been previously heated, are first mixed and the resulting mixture is mixed with the heated diisocyanate. This method is preferred for the reason that the extender and the polyester will not react prior to the introduction of diisocyanate and rapid mixing with the diisocyanate is thus facilitated.

The mixing of the polyester, the chain extender and diisocyanate may be suitably carried out by using any mechanical mixer such as one equipped with a stirrer which results in intimate mixing of the three ingredients in a short period of time. If the material begins to become too thick, either the temperature may be lowered or a small amount of citric acid or the like of from about 0.001 to 0.050 parts by weight based on 100 parts of the polyester may be added to slow down the reaction. Of course, to increase the rate of reaction, any suitable catalyst may be added to the reaction mixture such as tertiary amines and the like as set forth in U.S. Pat. Nos. 2,620,516; 2,621,166 and 2,729,618, all incorporated herein by reference.

Other techniques for the production of thermoplastic polyurethanes useful in the context of the present invention are disclosed in the text *Polyurethanes: Chemistry and Technology*, Vol. II, pages 299–452, by J. H. Saunders and K. C. Frisch, Interscience Publishers, New York 1964 and in the pamphlet *A Processing Handbook for Texin Urethane Elastoplastic Materials*, Mobay Chemical Corporation, Pittsburgh, PA, both incorporated by reference herein.

Although adipate polyesters are preferred in producing suitable thermoplastic polyurethanes, polyesters which are based on succinic acid, suberic acid, sebacic acid, oxalic acid, methyl adipic acid, glutaric acid, pimelic acid, azelaic acid, phthalic acid, terephthalic acid, isophthalic acid and the like may be used.

Suitable polyesters for the production of the thermoplastic polyurethanes also include those based on polymerization products of lactones, for example caprolactones.

A polyether may be used instead of the polyester in the preparation of the thermoplastic polyurethane, preferably polytetramethylene glycol, having an average molecular weight between about 600 and 2000 and preferably about 1000. Other polyethers such as polypropylene glycol, polyethylene glycol and the like may be used providing their molecular weight is above about 600.

The above and other thermoplastic polyurethanes such as disclosed in U.S. Pat. Nos. 2,621,166; 2,729,618; 3,214,411; 2,778,810; Canadian Pat. Nos. 754,233; 733,577 and 842,325, all incorporated herein by reference, may be used to produce the thermoplastic polyurethanes which are suitable in the context of the present invention.

"Thermoplastic polyurethane" as used herein may alternatively be defined as block polymers that are prepared from a diisocyanate, a polyester or polyether, and a chain extender and that are processable by all the standard techniques of compression or injection molding or by extrusion.

II. THERMOPLASTIC POLYPHOSPHONATES

In the context of the present invention, thermoplastic polyphosphonates may be either branched or nonbranched resins of a number average molecular weight between 11,000 and 220,000, preferably 20,000 to 200,000, as determined by membrane osmosis using membranes which are permeable to particles having a molecular weight of up to 3,000, characterized in that their molecular structure may be represented by the recurring units of

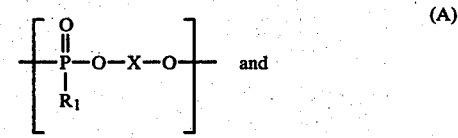

(A)

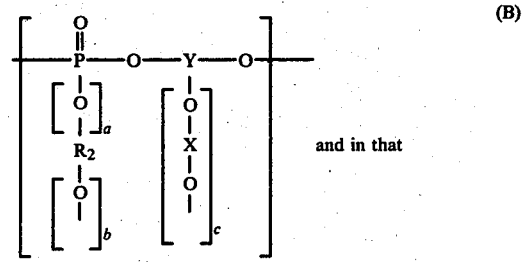

(B)

and in that

The terminal members bound to phosphorus atom in structures A and B are any of

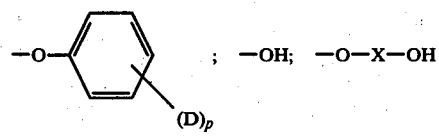

and in that the terminal members bound to the oxygen above are any of

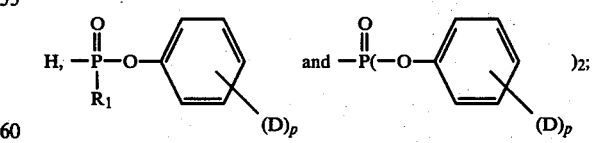

The proportion of B relative to the sum A+B may be from 0.001 to 3 mol percent. In the above representations $R_1$ denotes at least one of $C_1$–$C_{12}$ alkyl;

$C_2$–$C_{12}$ alkenyl;

$C_6$–$C_{30}$ cycloalkyl $C_6$–$C_{30}$ cycloalkenyl, $C_7$–$C_{30}$ arylalkyl or $C_8$–$C_{30}$ arylalkenyl, the aryl group in each case may be either unsubstituted or substituted by 1 to 5 $C_1$–$C_4$ alkyl groups or by 1 to 5 halogen atoms (fluorine, chlorine or bromine) or by the above-mentioned alkyl groups and halogen atoms;

X represents at least one of the following radicals:

phenylene 

biphenylene 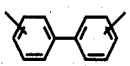

C$_1$-C$_4$ alkylene bis-phenylene 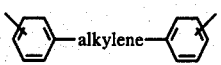

C$_5$-C$_{12}$ cycloalkylene bis-phenylene 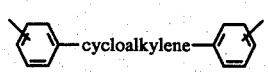

thiobis-phenylene 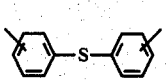

oxy-bis-phenylene 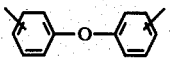

sulphonyl-bis-phenylene 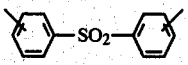

carbonyl-bis-phenylene 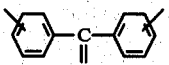

naphthylene 

wherein any phenyl nucleus may be either unsubstituted or substituted by 1 to 4 C$_1$-C$_4$ alkyl groups or by 1 to 4 halogen atoms (fluorine, chlorine or bromine) or by the above-mentioned alkyl groups and halogen atoms and the naphthylene nucleus may be either unsubstituted or substituted by 1 to 6 of at least one of the above-mentioned groups or atoms;

Y represents a trifunctional or tetrafunctional residue of a trifunctional mononuclear or trifunctional or tetrafunctional polynuclear phenol from which the phenolic hydroxyl groups have been removed (in the case of the polynuclear phenol), the aromatic nuclei carrying one or two phenolic hydroxy groups are connected by an aliphatic C$_1$-C$_7$ hydrocarbon radical or by at least one benzene radical;

Y represents X where c=0, a=1, b=1 and, at the same time, R$_2$=Y'—(—O—X—O—)$_c$, or R$_2$=X with y'

=Y and c' is either 1 or 2;
a =0 or the number 1;
b =0 or the number 1;
c =0 or one of the numbers 1 or 2, preferably c=1 or 2;

R$_2$=R$_1$ where a and b are each 0, in which case Y must represent a trifunctional or tetrafunctional radical, as defined above;

R$_2$ represents

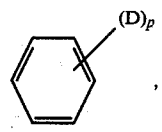

where a=1 and b=0, in which case Y must represent a trifunctional or tetrafunctional radical, as defined above;

R$_2$ represents X or Y'—(—O—X—O—)$_{c'}$ where a and b are each the number 1;

D represents the same or different groups and represents a C$_1$-C$_4$ alkyl group or halogen (F, Cl or Br) and p=0 or a number of from 1 to 5 preferably p=0.

The above definitions preferably have the following meaning:

R$_1$ represents at least one of the radicals methyl ethyl or benzyl, particularly methyl;

X represents at least one of the radicals phenylene, biphenylylene, C$_1$-C$_4$ alkylene bis-phenylene, in which case each phenyl nucleus may be substituted by 1 to r methyl groups, cyclohexylene-bis-phenylene, oxy-bis-phenylene, thio-bis-phenylene, sulphonyl-bis-phenylene, particularly C$_1$-C$_4$ alkylene-bis-phenylene, in which case each phenyl nucleus may be substituted by one or two methyl groups;

Y represents a trifunctional or tetrafunctional residue of a trifunctional mononuclear or trifunctional or tetrafunctional polynuclear phenol from which the phenolic hydroxy groups have been removed; in the case of the polynuclear phenol, the aromatic nuclei carrying one or two phenolic hydroxy groups may be connected by aliphatic C$_1$-C$_7$ hydrocarbon radicals or by at least one benzene radical;

a=0 or the number 1;
b=0 or the number 1;
c=one of the numbers 1 or 2;
R$_2$ =R$_1$ where a and b are each 0;
R$_2$ represents

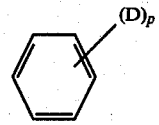

where a=1 and b=0;

R$_2$ represents X or Y'—(—O—X—O—)$_{c'}$ where a and b are each the number 1;

D represents the same of different groups and represents a C$_1$-C$_4$ alkyl group and p=0 or a number of from 1 to 5, more particularly p=0.

The thermoplastic, branched, aromatic polyphosphonates may be prepared by a process whereby diaryl phosphonates and optionally triaryl phosphonates are transesterified, with an aromatic dihydroxy compound and optionally an aromatic trihydroxy or tetrahydroxy compound, in the melt accordance with a process more fully described in German Patent Application Ser. No. P 29 44 093.5, incorporated by reference herein.

III. POLYCARBONATES

The polycarbonates used in the practice of the invention are aromatic homopolycarbonates and aromatic copolycarbonates based, for example, on one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)- sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropylbenzenes and nuclear-alkylated derivatives thereof.

Examples of other suitable diphenols are bis-(4-hydroxyphenyl)-methane (bisphenol F); 2,4-bis-(4-hydroxyphenyl)-butane; 1,1-bis-(4-hydroxyphenyl)-cyclohexane; 2,2-bis-(3-methyl-4-hydroxyphenyl)-propane; bis-(3,5-dimethyl-4-hydroxyphenyl)-methane; 2,2-bis-(3,5-dimethyl-4-hydroxyphenyl)-propane; 2,4-bis-(3,5-dimethyl-4-hydroxyphenyl)-2-methylbutane and 1,1-bis-(3,5-dimethyl-4-hydroxyphenyl)-cyclohexane.

Other diphenols which are suitable are bis-(hydroxyaryl)-$C_1$–$C_8$-alkanes and bis-(hydroxyaryl)-$C_5$–$C_6$-cycloalkanes, in particular bis-(4-hydroxyphenyl)-$C_1$–$C_8$-alkanes and bis-(4-hydroxyphenyl)-$C_5$–$C_6$-cycloalkanes.

These and other suitable diphenols are described, for example, in U.S. Pat. Nos. 3,028,365; 2,999,835; 3,148,172; 2,991,273; 3,271,367 and 2,999,846, in German Offenlegungsschriften Nos. 1,570,703; 2,063,050; 2,063,052; 2,211,956 and 2,211,975; in French Pat. No. 1,561,518 and in the monograph "H. Schnell, *Chemistry and Physics of Polycarbonates,* Interscience Publishers, New York, 1964", all incorporated herein by reference.

The aromatic polycarbonates can be prepared by known processes, thus, for example, from bisphenol and diphenyl carbonate by the melt transesterification process and from bisphenols and phosgene by the two-phase boundary process, as described in the above-mentioned literature.

The preferred bisphenols are those described by formulae I and II below.

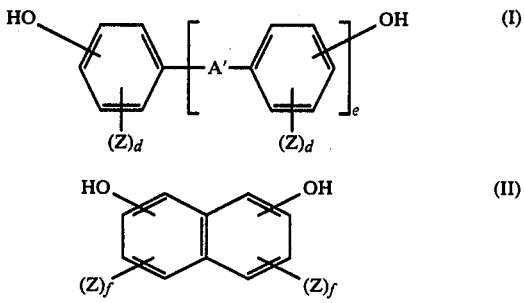

wherein
A' denotes a single bond a $C_1$–$C_4$ alkylene, a $C_5$–$C_6$ cycloalkylene, a sulphonyl, or a carbonyl group, sulfur or oxygen;
e denotes 0 or 1;
Z represents F, CL, Br or a $C_1$–$C_4$ alkyl and where d or f are greater than one the substituents are independent of each other;
d is 0 to 4 and f is 0 to 3.

It is particularly preferred to use compounds of formula I in which e=1 and A' is either a single bond, the 2,2-propylene radical or sulphur and d=0, especially preferred are 2,2-bis-(4-hydroxy phenyl)-propane and 4,4'-dihydroxy diphenyl.

Aromatic polycarbonates in the context of the invention are, in particular, homopolycarbonates of bis-2-(4-hydroxyphenyl)-propane (bisphenol A) and copolycarbonates of at least 30 mol %, preferably at least 60 mol % and in particular at least 80 mol %, of bisphenol A and up to 70 mol %, preferably up to 40 mol % and in particular up to 20 mol %, of other diphenols (the mol percentages in each case relate to the total molar amount of cocondensed diphenols).

Copolycarbonates which are preferred according to the invention contain bisphenol A and 1,1-bis-(4-hydroxyphenyl)-cyclohexane (bisphenol Z).

The aromatic polycarbonates can be branched by incorporating small amounts, preferably amounts of between 0.05 and 2.0 mol % (relative to the diphenols employed), of compounds which are trifunctional or more than trifunctional, in particular those with three or more phenolic hydroxyl groups. Polycarbonates of this type are described, for example, in German Offenlegungsschriften Nos. 1,570,533; 1,595,762; 2,116,974; 2,113,347 and 2,500,092; in British Pat. No. 1,079,821 and in U.S. Pat. No. 3,544,514, all incorporated by reference herein.

The weight-average molecular weights of the polycarbonates which are suitable according to the invention may be over 24,000 preferably between 35,000 and 120,000, and in particular between 42,000 and 95,000 (determined by measuring the intrinsic viscosity in 0.5% $CH_2Cl_2$ solution).

In the process according to the present invention, the thermoplastic ternary molding composition may contain thermoplastic polyurethane and thermoplastic polyphosphonate or any weight ratio there between. The more practical ternary compositions contain at least 5 percent, preferably at least 10 percent, by weight of polyurethane and at least 5 percent preferably at least 10 percent, by weight of polyphosphonate.

In preparing the binary composition which comprises polyphosphonate and polycarbonate resin one may use any weight proportion between the two resins, but preferably the polycarbonate resin may constitute at least 5 percent, preferably 15 percent, by weight of said binary composition.

The preparation of the binary composition may be carried out in any suitable equipment known in the art where thermally assisted blending of thermoplastic resin may be done. Typically, extrusion blending is among the preferred methods for the preparation of the binary compositions of polyphosphonate and polycarbonates.

In the preparation of the ternary composition, the extrudate comprising polyphosphonate and polycarbonate, in either pellet or powder form, should be thoroughly dried prior to the co-extrusion thereof with the polyurethane. In the process of the invention, the binary composition of polyphosphonate and polycarbonate is blended upon comelting, such as by extrusion, with the thermoplastic polyurethane to produce a homogeneous, well dispersed ternary molding composition. Care should be taken to dry the polyurethane prior to the melting step.

The ternary molding compositions of the invention may be used in any of the processes commonly employed in thermoplastic processing, for instance, extrusion or injection molding.

Monomeric or polymeric additives as well as fillers may be added to the ternary molding compositions of the invention. Among these are dyestuffs, pigments, mold release agents, hydrolytic stabilizers as well as UV and heat stabilizers, lubricants and fillers such as glass particulates, plastics or metal powders, fibers of any type may be used as well.

EXAMPLE 1

A binary blend consisting of equal weights of a thermoplastic polyphosphonate and polycarbonate was first prepared by co-extrusion. About 240 gms of this blend in a dry powder form was then extrusion blended with about 960 gms of dry thermoplastic polyurethane and 1.8 gms of a mold release agent (Acrawax C from Glyco Chemical Incorporated). The temperature setting of the extruder was: rear—500° F., front—320° F., die—470° F. The extrudate characterized as well dispersed, was tested after aging for 11 days at 55% R.H. and its properties are reported as follows:

| Composition, weight percent | |
|---|---|
| Binary blend[1] | 20.0 |
| Polyurethane[2] | 80.0 |
| Tensile strength, MPa | 34.0 |
| Elongation, % | 455.0 |
| Elongations set, % | 115.0 |
| Tensile modulus, MPa | |
| at 100% elongation | 14.1 |
| at 200% elongation | 18.6 |
| at 300% elongation | 28.9 |
| shore hardness | 54 |

[1] 50% by weight of Merlon M-50 polycarbonate and polymethyl phosphonate [poly-(4,4'-dioxydiphenyl-) methylphosphonate having a relative viscosity of 1.35 as measured in 0.5% solution of $CH_2CL_2$ at 25° C.].
[2] Texin 445D from Mobay Chemical Corporation.

EXAMPLES 2-5

Binary blends comprising equal weights of polyphosphonates and polycarbonates were prepared as described above and were then co-extruded with thermoplastic polyurethane to produce well dispersed ternary blends. The table below summarizes the results of the flammability ratings of these polyblends. The compositions, except #5, included a minor amount, about 0.15%, of the mold release agent described above. Co-extrusion was carried out on a 1¼" extruder, at a temperature setting: Rear—490° F., Front—325° F., and Die—465° F.

| | 2 | 3 | 4 | 5 (control) |
|---|---|---|---|---|
| composition, wt. percent | | | | |
| Thermoplastic polyurethane[1] | 80.0 | 60.0 | 40.0 | 100.0 |
| PC/POP blend[2] | 20.0 | 40.0 | 60.0 | |
| Flammability rating per UL-94 method specimen thickness (inches) | V-0 | V-0 | V-2 | V-2 |
| | 0.128 | 0.129 | 0.130 | 0.130 |

[1] Texin 445D
[2] A blend of equal weights of polymethyl phosphonate and polycarbonate, Merlon M-50.

EXAMPLES 6-15

The oxygen indices, measured per ASTM D-2863, of compositions according to the present invention are reported in the table below. The data shows that the incorporation of the blend or polycarbonate/polymethylphosphonate in thermoplastic polyurethane raises the oxygen index of the later. The compositions were extruded under the condition: Rear 500°-520° F., Front 325°-350° F., Die 460°-475° F.

| Composition | | | |
|---|---|---|---|
| Thermoplastic polyurethane | Blend of polycarbonate[1] polyphosphonate[2] | Composition Ratio | Oxygen Index |
| Texin 445D[3] | — | 100/0 | 22.2 |
| Texin 445D[3] | 50/50 | 98/2 | 24.0 |
| Texin 445D[3] | 50/50 | 95/5 | 25.1 |
| Texin 445D[3] | 50/50 | 90/10 | 26.7 |
| Texin 445D[3] | 50/50 | 80/20 | 26.9 |
| Texin 985A[3] | — | 100/0 | 21.7 |
| Texin 985A[3] | 75/25 | 95/5 | 23.5 |
| Texin 985A[3] | 75/25 | 80/20 | 24.0 |
| Texin 985A[3] | 90/10 | 80/20 | 23.7 |
| Texin 985A[3] | 95/5 | 80/20 | 24.8 |

[1] Merlon M-50 from Mobay Chemical Corporation
[2] Polymethylphosphonate
[3] Thermoplastic polyurethane from Mobay Chemical Corporation based on adipic acid (445D) or polytetramethylene glycol (985A) and butane diol and MDI.

What is claimed is:
1. A well dispersed thermoplastic ternary molding composition comprising polyurethane, polycarbonate and polyphosphonate.
2. The molding composition of claim 1, wherein said polyphosphonate is characterized by the molecular structure comprising

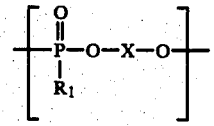

wherein X denotes an aromatic radical and $R_1$ denotes $C_1$–$C_{12}$ alkyl, $C_2$–$C_{12}$ alkenyl, $C_6$–$C_{30}$ cycloalkyl, $C_6$–$C_{30}$ cycloalkenyl, $C_7$–$C_{30}$ arylalkyl or $C_8$–$C_{30}$ arylalkenyl.
3. The molding composition of claim 1 wherein said polycarbonate constitutes from about 0.5 to about 80 percent relative to the weight of said composition.
4. The molding composition of claim 1 wherein said polyphosphonate constitute from about 0.5 to about 80 percent relative to the weight of said composition.
5. The molding composition of claim 1 or 4 wherein said polyphosphonate is selected from the group consisting of polymethylphosphonate and polyethylphosphonate.
6. A process for the preparation of a well-dispersed thermoplastic ternary molding composition comprising
   (i) blending upon comelting of polyphosphonate and polycarbonate resins to obtain a binary composition
   (ii) blending upon comelting of said binary composition with thermoplastic urethane.
7. The process of claim 6 wherein said blending upon comelting is carried out by extrusion.
8. The process of claim 6 wherein said polyphosphonate is characterized by the molecular structure comprising

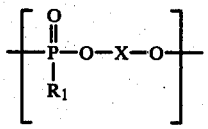

wherein X denotes an aromatic radical and $R_1$ denotes $C_1$–$C_{12}$ alkyl, $C_2$–$C_{12}$ alkenyl, $C_6$–$C_{30}$ cycloalkyl and $C_6$–$C_{30}$ cycloalkenyl, $C_7$–$C_{30}$ arylalkyl, and $C_8$–$C_{30}$ arylalkenyl.
9. The process of claim 6 wherein said polycarbonate constitutes at least 10 percent of said binary composition.
10. The process of claim 6 wherein said polyphosphonate is selected from the group consisting of polymethylphosphonate and polyethylphosphonate.

* * * * *